(12) United States Patent
Matsumura et al.

(10) Patent No.: US 6,197,101 B1
(45) Date of Patent: Mar. 6, 2001

(54) COATING COMPOSITIONS, METHOD OF FORMING HYDROPHILIC FILMS, AND HYDROPHILIC FILM-COATED ARTICLES

(75) Inventors: Kazuyuki Matsumura; Masahiro Furuya; Masaaki Yamaya; Akira Yamamoto, all of Kashima-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/151,727

(22) Filed: Sep. 11, 1998

(30) Foreign Application Priority Data

Sep. 12, 1997 (JP) .................................................. 9-268098

(51) Int. Cl.$^7$ ............................. C09D 5/16; C09D 183/08
(52) U.S. Cl. ...................................... 106/287.11; 427/515
(58) Field of Search ........................ 106/287.11; 427/515

(56) References Cited

U.S. PATENT DOCUMENTS

| | | | |
|---|---|---|---|
| 5,743,951 | 4/1998 | Ozai et al. ...................... | 106/287.11 |
| 5,755,867 | 5/1998 | Chikuni et al. .................. | 106/287.16 |
| 5,789,082 | 8/1998 | Treadway ............................. | 428/412 |
| 5,902,847 | 5/1999 | Yanagi et al. . | |

FOREIGN PATENT DOCUMENTS

| | | | |
|---|---|---|---|
| 56-125462 | 10/1981 | (JP) | ................................. 106/287.11 |
| 9-227829 | 2/1997 | (JP) . | |
| 9-040907 | 10/1997 | (JP) . | |

*Primary Examiner*—David Brunsman
(74) *Attorney, Agent, or Firm*—Millen, White, Zelano & Branigan, P.C.

(57) ABSTRACT

Coating compositions comprising (a) an organosilicon compound obtained by the hydrolysis in water of a hydrolyzable mixture of specific hydrolyzable silanes or their partial hydrolyzates, (b) water, and (c) a microparticulate photo-oxidation catalyst, substantially reduce or eliminate the amount of organic solvent required. In addition, these coating compositions provide applied films having good weather resistance and antifouling properties, and are themselves stable even at an alkaline pH.

19 Claims, No Drawings

COATING COMPOSITIONS, METHOD OF FORMING HYDROPHILIC FILMS, AND HYDROPHILIC FILM-COATED ARTICLES

BACKGROUND OF THE INVENTION

1. Field of the Invention

The present invention relates to coating compositions highly suitable for the protection of articles directly exposed to the elements, such as buildings and other structures. This invention relates also to a method of forming hydrophilic films using these compositions, and to coated articles having hydrophilic films obtained with these compositions.

2. Prior Art

Because of their corrosion resistance and weathering resistance, silicone resins and fluorocarbon resins are commonly employed in exterior coatings used on buildings and structures which are directly exposed to the elements. Coats composed of these resins are resistant to degradation by acid rain and long-term exposure to sunlight. These coatings had generally been thought to be endowed also with excellent antifouling properties, but long-term weathering resistance tests showed that, due to the influence of atmospheric grime, dust and grit, iron particles, acid rain and the like, contaminants gradually deposit onto the surface of the coat, causing a deterioration in its appearance that is indicative of the coatis inadequate antifouling properties.

One known method for providing a coat with improved antifouling properties makes use of a self-cleaning effect achieved by adding to the paint or coating an alkyl silicate which is a silanol group precursor, and rendering the surface of the applied coat hydrophilic, so that contaminants are washed from the coat by rainwater. Contaminant adsorption can be prevented for a while in this way, but the self-cleaning effect is short-lived because the hydrophilizing substance is readily carried away on account of poor water resistance, and contaminants eventually become firmly attached to the coat surface. Prior-art techniques for preventing the deposition of contaminants by hydrophilizing the coat surface were thus inadequate in the durability and persistence of the desired effect. Another approach for preventing the hydrophilizing substance from being carried away involves the introduction of organic functional groups, but the degree of hydrophilization is unsatisfactory (see JP-A 40907/1997, JP-A 40908/1997, JP-A 40909/1997, JP-A 40911/1997).

International Patent Application WO 96/29375 describes a recently discovered method for imparting hydrophilicity to a coat that involves adding a microparticulate photooxidation catalyst, typically titanium oxide, to the coating composition. Irradiation of the photooxidation catalyst-containing coat with UV-containing light renders the coat hydrophilic to an extent where the water-drop contact angle of the surface becomes 10 degrees or less. This is believed to be a hydrophilizing system in which electrons and holes form at the surface of the fine photocatalyst particles that have been exposed to light. Oxygen and water in the air are oxidized and reduced at the surface of these particles, generating active radical species which in turn partially decompose the silicone resin serving as the binder in the coat, forming hydrophilic silanol groups at the surface of the coat, where moisture in the air is then adsorbed. Deposited organic contaminants are self-cleaned from the coat by rainwater. The hydrophilic properties of the coat can be maintained because even the contaminating ingredients that adhere to the surface of the coat are completely degraded oxidatively by the radical species which are generated. In addition, the presence of numerous hydroxyl groups at the surface of the fine particles of the photooxidation catalyst, such as titanium oxide, allows the particles to bond securely to the binder resin and not be carried away from the coat, thus making it possible to semi-permanently sustain the antifouling properties.

One known example of the generation of radicals by a photooxidation catalyst is the degradative deterioration (or chalking) by sunlight of a paint film in which titanium oxide is used as a white pigment. The surface of pigment-grade titanium oxide is generally coated with a metal oxide such as silica or alumina, which prevents the formation of radicals to a considerable yet incomplete degree. In long-term exposure tests on paint films, the erosion of resin from about the pigment is due to degradation of the resin by the small amount of radicals that are generated. Therefore, the binder resin in a hydrophilizable, photooxidation catalyst-containing coat must not be readily subject to chalking, and only the surface-most layer of the coat must be attacked by radicals to induce a very slight degree of resin degradation for hydrophilization. Silicone resins and modified silicone resins are suitable as this type of resin.

The silicone resins used as binders in paints and coatings are generally diluted with organic solvents. Even the photooxidation catalyst-containing coating compositions in above-mentioned International Patent Application WO 96/29375 invariably contain an organic solvent for dissolving the silicone resin. However, problems associated with the use of organic solvents, such as environmental contamination, toxicity to workers during application, and fire and explosion hazards, have led to a heightened demand for organic solvent-free water-based coatings.

In the design of a water-based silicone resin coating, methods which use a water-insoluble silicone resin as an emulsion obtained by dispersion of the resin in water and methods which use a water-soluble silicone resin may be contemplated. Silicone resin emulsion coatings do not require hydrophilic groups within the resin, in addition to which they have excellent water resistance, making them suitable as water-based coatings. On the other hand, depending on the type of emulsifying agent used, they may be subject to a strong pH influence, resulting in poor stability. Moreover, the processes involved in the preparation of silicone resin emulsion coatings tend to be complex and to require the use of large-scale emulsifying equipment, which can lead to considerable expense. As for the commonly used water-soluble silicone resins, condensation reactions readily occur to induce gelation in pH regions other than the weakly acidic pH levels at which the silanol groups are stable, and especially at an alkalinity of pH 9 or more.

In addition, microparticulate photooxidation catalyst-containing suspensions generally remain stably dispersed at a strong acidity of pH 4 or less and at a strong alkalinity of pH 9 or more. However, on account of problems associated with rusting and corrosion in actual use, it is advantageous to make appropriate use of microparticulate photooxidation catalyst-containing suspensions having an alkaline pH.

SUMMARY OF THE INVENTION

It is, therefore, an object of the present invention to provide a novel coating composition comprising a silicone resin and a microparticulate photooxidation catalyst, which forms a hydrophilic coating having improved antifouling properties and light resistance and which is stable even at alkaline pH levels. Another object of the invention is to provide a method of forming such hydrophilic films. A further object is to provide articles coated with these hydrophilic films.

We have found that the above objects are achieved with coating compositions comprising a water-based silicone resin compound composed primarily of specific silicone resins and a microparticulate photooxidation catalyst for rendering hydrophilic the surface of an applied film of the coating composition.

Based on this discovery, the present invention provides a coating composition comprising:

(a) 100 parts by weight of an organosilicon compound obtained by hydrolyzing, in water or in an organic solvent containing at least an amount of water necessary for hydrolysis, a hydrolyzable silane mixture which includes (i) 100 parts by weight of a nitrogenous organic group-containing hydrolyzable silane of the following general formula (1):

$$YR_m^1SiR_{3-m}^2 \tag{1}$$

wherein $R^1$ is a substituted or unsubstituted monovalent hydrocarbon group having 1 to 8 carbons, $R^2$ is an alkoxy or acyloxy group having 1 to 4 carbons, Y is a nitrogenous organic group, and m is 0 or 1, or a partial hydrolyzate thereof, and (ii) from 5 to 200 parts by weight of a hydrolyzable silane of the following general formula (2):

$$R_n^3SiR_{4-n}^4 \tag{2}$$

wherein $R^3$ is a substituted or unsubstituted monovalent hydrocarbon group having 1 to 8 carbons, $R^4$ is an alkoxy or acyloxy group having 1 to 4 carbons, and n is 0, 1 or 2, or a partial hydrolyzate thereof;

(b) from 10 to 2,000 parts by weight of water; and (c) fine particles of a photooxidation catalyst.

The invention also provides a method of forming a hydrophilic film by applying the above composition onto a substrate to form a film and irradiating UV-containing light to a surface of the film so that the film surface may have a contact angle with water of up to 60 degrees. The invention provides as well a hydrophilic film-coated article comprising a substrate having on a surface thereof a film of the above composition, which film has a contact angle with water of up to 60 degrees.

According to the invention, a water-based silicone resin composition which is stable in an aqueous solution and, in particular, is stable even in an alkaline aqueous solution is obtained simply by hydrolyzing a mixture of (i) a nitrogenous organic group-containing hydrolyzable silane of formula (1) or a partial hydrolyzate thereof, and (ii) a hydrolyzable silane of formula (2) or a partial hydrolyzate thereof, in water or in at least an amount of water necessary for hydrolysis. The composition comprising components (a) to (c) is applied to a substrate to form a film. Upon exposure to UV-containing light, this film becomes hydrophilic.

More particularly, at room temperature or under heating, the reactive groups present in the resin at the interior of the film formed by the coating composition of the invention undergo crosslinking reactions that induce curing, thereby giving a firm coat. Fine particles of the photooxidation catalyst are dispersed within the film. When the particles are composed of a metal oxide, chemical bonds form between hydroxyl groups at the surface of the particles and silanol groups within the silicone resin, thereby immobilizing the photooxidation catalyst particles on the film and at the film interior. Irradiating this coat with UV-containing light, typically sunlight, triggers the oxidizing action of the photooxidation catalyst, causing the contact angle of the surface with water to become 60 degrees or less. Continued exposure to sunlight, and the attendant rise in the dose of light incurred by the coat, leads to a further decline in the contact angle, with a contact angle as low as 10 degrees or less being attainable.

Hence, the coating compositions of this invention are effective for protecting the surfaces of articles directly exposed to the elements, such as buildings and other structures. Moreover, because of the presence of particles having a photooxidation catalytic activity, the surface of the applied coat is rendered hydrophilic when exposed to UV-containing light, thus exhibiting excellent antifouling properties. The microparticulate photooxidation catalyst also has light resistance (i.e., it is UV light-absorbing), and is thus able to protect the substrate from deterioration, discoloration, fading and other undesirable changes due to sunlight. In particular, the coating composition of the present invention uses a water-soluble silicone resin as the binder resin and is substantially free of organic solvents. Hence, environmental contamination is minimal and safety during coating operations is excellent. Moreover, the coating composition is stable even in the alkaline region of the pH scale. In addition, because the microparticulate photooxidation catalyst absorbs ultraviolet light and assists the silicone resins in manifesting antifouling effects, the coating composition of the invention also serves to protect the underlying substrate from harmful UV radiation, thereby making it possible to prevent the fading and discoloration of signs and billboards, printed articles, and the like.

DETAILED DESCRIPTION OF THE INVENTION

As described above, component (a) of the coating composition according to the present invention is an organosilicon compound obtained by hydrolyzing a hydrolyzable silane mixture in water or an organic solvent containing at least an amount of water necessary for hydrolysis. The hydrolyzable silane mixture includes (i) 100 parts by weight of a nitrogenous organic group-containing hydrolyzable silane of formula (1) or a partial hydrolyzate thereof and (ii) from 5 to 200 parts by weight of a hydrolyzable silane of formula (2) or a partial hydrolyzate thereof.

$$YR_m^1SiR_{3-m}^2 \tag{1}$$

$R^1$ is a substituted or unsubstituted monovalent hydrocarbon group having 1 to 8 carbons, $R^2$ is an alkoxy or acyloxy group having 1 to 4 carbons, Y is a nitrogenous organic group, and m is 0 or 1.

$$R_n^3SiR_{4-n}^4 \tag{2}$$

$R^3$ is a substituted or unsubstituted monovalent hydrocarbon group having 1 to 8 carbons, $R^4$ is an alkoxy or acyloxy group having 1 to 4 carbons, and n is 0, 1 or 2.

The nitrogenous organic group-containing hydrolyzable silane as component (i) functions to make the system water-soluble. In order to confer water-solubility to the organosilicon compound serving as a primary component of the desired water-based silicone resin coating composition, use is made here of a compound having general formula (1):

$$YR_m^1SiR_{3-m}^2 \tag{1}$$

wherein $R^1$ is a nitrogen-free, substituted or unsubstituted, monovalent hydrocarbon group having 1 to 8 carbons, $R^2$ is an alkoxy or acyloxy group having 1 to 4 carbons, Y is a nitrogenous organic group, and m is 0 or 1. The nitrogenous organic group-containing hydrolyzable compounds of formula (1) may be used alone or as a mixture of two or more. Partial hydrolyzates of these may also be used.

In formula (1), $R^1$ represents a substituted or unsubstituted monovalent hydrocarbon group having 1 to 8 carbons, such as alkyl, cycloalkyl, alkenyl, aryl, and aralkyl groups, as well as groups in which some or all of the hydrogen atoms in the foregoing groups are substituted with halogen atoms such as fluorine. Illustrative examples include —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)CH_3$, —$C(CH_3)_3$, —$C_6H_5$, and —$C_6H_{13}$.

$R^2$ in formula (1) represents an alkoxy or acyloxy group having 1 to 4 carbons. Illustrative examples include —$OCH_3$, —$OCH_2CH_3$, —$OCH_2CH_2CH_3$, —$OCH(CH_3)_2$, —$OCH_2CH_2CH_2CH_3$, —$OCH(CH_3$, —$OCH_2CH(CH_3)CH_3$, —$OC(CH_3)_3$, —$OCOCH_3$, and —$OCOCH_2CH_3$. Of these, —$OCH_3$ and —$OC_2H_5$ are preferred.

Y is a nitrogenous organic group. Examples include those represented by formulas (3) to (6) below.

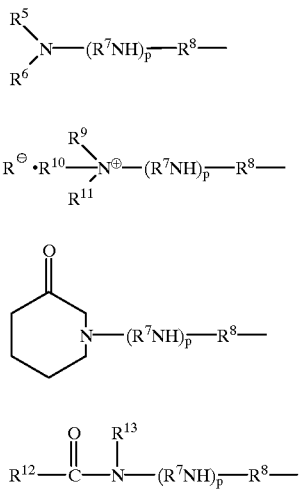

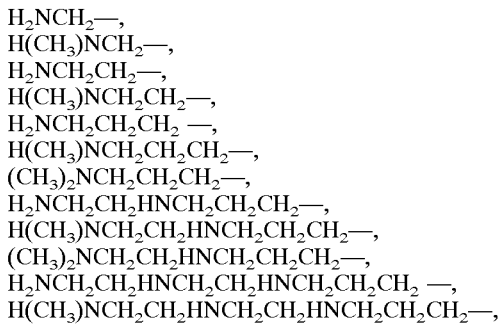

Herein, $R^5$, $R^6$, and $R^9$ to $R^{13}$ are hydrogen atoms or monovalent hydrocarbon groups having 1 to 8 carbons, with $R^5$ and $R^6$, $R^9$ and $R^{10}$ and $R^{11}$, and $R^{12}$ and $R^{13}$, respectively, being mutually the same or different; R is a halogen atom; $R^7$ and $R^8$ are divalent hydrocarbon groups having 1 to 8 carbons atoms, with $R^7$ and $R^8$ being mutually the same or different; and p is 0 or an integer from 1 to 3.

The aforementioned monovalent hydrocarbon groups having 1 to 8 carbons are as defined above for $R^1$. Illustrative examples of the divaient hydrocarbon groups having 1 to 8 carbons include alkylene groups of the formulas given below.

$H_2NCH_2$—,
$H(CH_3)NCH_2$—,
$H_2NCH_2CH_2$—,
$H(CH_3)NCH_2CH_2$—,
$H_2NCH_2CH_2CH_2$ —,
$H(CH_3)NCH_2CH_2CH_2$—,
$(CH_3)_2NCH_2CH_2CH_2$—,
$H_2NCH_2CH_2HNCH_2CH_2CH_2$—,
$H(CH_3)NCH_2CH_2HNCH_2CH_2CH_2$—,
$(CH_3)_2NCH_2CH_2HNCH_2CH_2CH_2$—,
$H_2NCH_2CH_2HNCH_2CH_2HNCH_2CH_2CH_2$ —,
$H(CH_3)NCH_2CH_2HNCH_2CH_2HNCH_2CH_2CH_2$—, $Cl^-(CH_3)_3N^+CH_2CH_2CH_2$ —,
$Cl^-(CH_3)_2(C_6H_5—CH_2—)N^+CH_2CH_2CH_2$—,

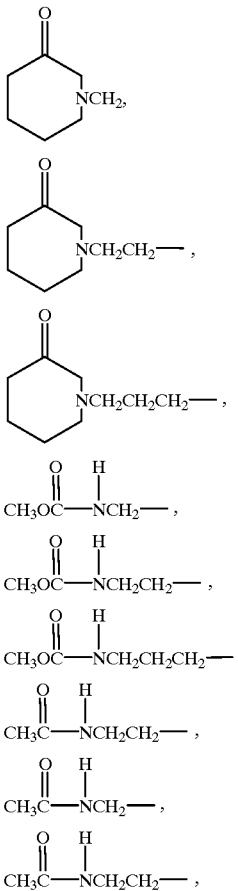

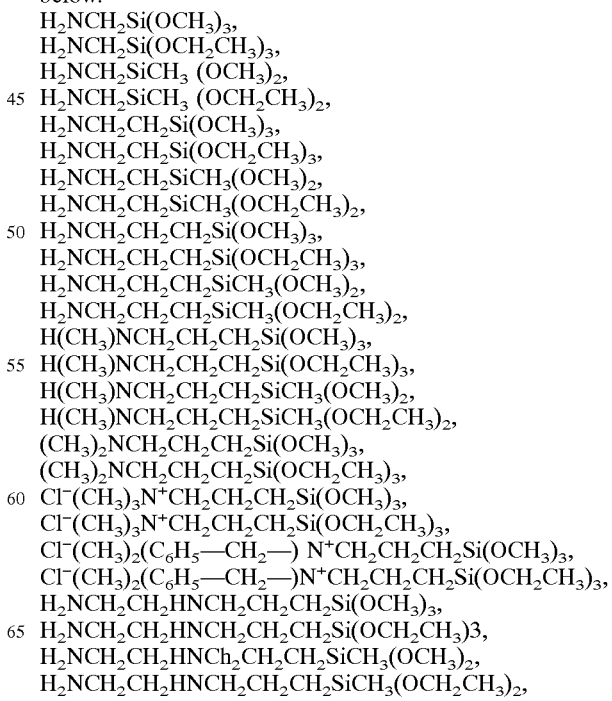

Illustrative examples of the nitrogenous organic group-containing hydrolyzable silanes of formula (1) are given below.

$H_2NCH_2Si(OCH_3)_3$,
$H_2NCH_2Si(OCH_2CH_3)_3$,
$H_2NCH_2SiCH_3 (OCH_3)_2$,
$H_2NCH_2SiCH_3 (OCH_2CH_3)_2$,
$H_2NCH_2CH_2Si(OCH_3)_3$,
$H_2NCH_2CH_2Si(OCH_2CH_3)_3$,
$H_2NCH_2CH_2SiCH_3(OCH_3)_2$,
$H_2NCH_2CH_2SiCH_3(OCH_2CH_3)_2$,
$H_2NCH_2CH_2CH_2Si(OCH_3)_3$,
$H_2NCH_2CH_2CH_2Si(OCH_2CH_3)_3$,
$H_2NCH_2CH_2CH_2SiCH_3(OCH_3)_2$,
$H_2NCH_2CH_2CH_2SiCH_3(OCH_2CH_3)_2$,
$H(CH_3)NCH_2CH_2CH_2Si(OCH_3)_3$,
$H(CH_3)NCH_2CH_2CH_2Si(OCH_2CH_3)_3$,
$H(CH_3)NCH_2CH_2CH_2SiCH_3(OCH_3)_2$,
$H(CH_3)NCH_2CH_2CH_2SiCH_3(OCH_2CH_3)_2$,
$(CH_3)_2NCH_2CH_2CH_2Si(OCH_3)_3$,
$(CH_3)_2NCH_2CH_2CH_2Si(OCH_2CH_3)_3$,
$Cl^-(CH_3)_3N^+CH_2CH_2CH_2Si(OCH_3)_3$,
$Cl^-(CH_3)_3N^+CH_2CH_2CH_2Si(OCH_2CH_3)_3$,
$Cl^-(CH_3)_2(C_6H_5—CH_2—) N^+CH_2CH_2CH_2Si(OCH_3)_3$,
$Cl^-(CH_3)_2(C_6H_5—CH_2—)N^+CH_2CH_2CH_2Si(OCH_2CH_3)_3$,
$H_2NCH_2CH_2HNCH_2CH_2CH_2Si(OCH_3)_3$,
$H_2NCH_2CH_2HNCH_2CH_2CH_2Si(OCH_2CH_3)_3$,
$H_2NCH_2CH_2HNCh_2CH_2CH_2SiCH_3(OCH_3)_2$,
$H_2NCH_2CH_2HNCH_2CH_2CH_2SiCH_3(OCH_2CH_3)_2$,

H₂NCH₂CH₂HNCH₂CH₂HNCH₂CH₂CH₂Si(OCH₃)₃,
H₂NCH₂CH₂HNCH₂CH₂HNCH₂CH₂CH₂Si(OCH₂CH₃)₃,
H₂NCH₂CH₂HNCH₂CH₂HNCH₂CH₂CH₂SiCH₃(OCH₃)₂,
H₂NCH₂CH₂HNCH₂CH₂HNCH₂CH₂CH₂SiCH₃(OCH₂CH₃)₂,

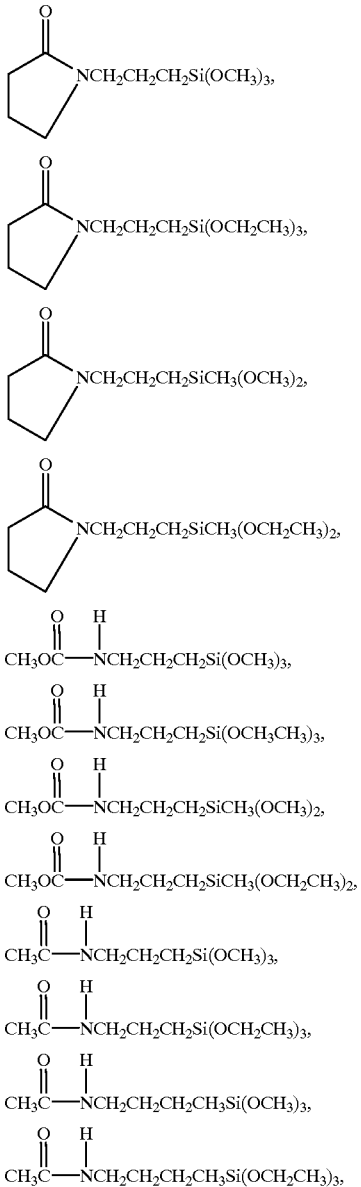

Of these, H₂NCH₂CH₂HNCH₂CH₂CH₂Si(OCH₃)₃ and H₂NCH₂CH₂HNCH₂CH₂CH₂Si(OCH₂CH₃)₃ are especially preferred. Hydrolyzates of the above may also be used.

The hydrolyzable silane serving as component (ii) has the general formula (2):

$$R_n^3 SiR_{4-n}^4 \quad (2)$$

wherein $R^3$ is a substituted or unsubstituted monovalent hydrocarbon group having 1 to 8 carbons, $R^4$ is an alkoxy or acyloxy group having 1 to 4 carbons, and n is 0, 1 or 2. The hydrolyzable silanes may be used alone or as a mixture of two or more thereof. Partial hydrolyzates of these may also be used.

In formula (2), $R^3$ represents a nitrogen-free, substituted or unsubstituted, monovalent hydrocarbon group having 1 to 8 carbons, such as alkyl, cycloalkyl, alkenyl, aryl, and aralkyl groups, as well as these groups in which some or all of the hydrogen atoms are substituted with halogen atoms such as fluorine. Illustrative examples include —CH₃, —CH₂CH₃, —CH₂CH₂CH₃, —CH(CH₃)₂, —CH₂CH₂CH₂CH₃, —CH(CH₃)CH₂CH₃, —CH₂CH(CH₃)CH₃, —C(CH₃)₃, —C₆H₅, and —C₆H₁₃.

$R^4$ in formula (2) represents an alkoxy or acyloxy group having 1 to 4 carbons. Illustrative examples include —OCH₃, —OCH₂CH₃, —OCH₂CH₂CH₃, —OCH(CH₃)₂, —OCH₂CH₂CH₂CH₃, —OCH(CH₃)CH₂CH₃, —OCH₂CH(CH₃)CH₃, —OC(CH₃)₃, —OCOCH₃, and —OCOCH₂CH₃. Of these, —OCH₃ and —OC₂H₅ are preferred.

Examples of the hydrolyzable silanes of formula (2) are given below.
Si(OCH₃)₄,
Si(OCH₂CH₃)₄,
Si(OCH₂CH₂CH₃)₄,
Si(OCH₂CH₂CH₂CH₃)₄,
CH₃Si(OCH₃)₃,
CH₃Si(OCH₂CH₃)₃,
CH₃Si(OCH₂CH₂CH₃)₃,
CH₃Si(OCH₂CH₂CH₂CH₃)₃,
(CH₃)₂Si(OCH₃)₂,
(CH₃)₂Si(OCH₂CH₃)₂,
(CH₃)₂Si(OCH₂CH₂CH₃)₂,
(CH₃)₂Si(OCH₂CH₂CH₂CH₃)₂,

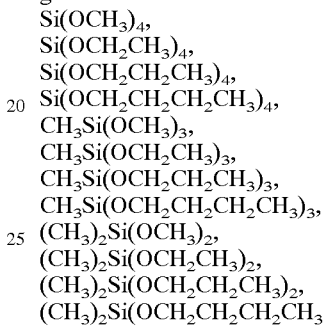

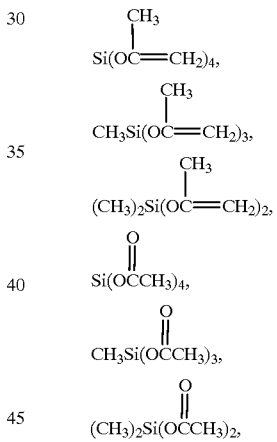

Of these, Si(OCH₃)₄, Si(OCH₂CH₃)₄, CH₃Si(OCH₃)₃, CH₃Si(OCH₂CH₃)₃, and partial hydrolyzates of these are especially preferred.

When the nitrogenous organic group-containing hydrolyzable silane having formula (1) or a partial hydrolyzate thereof (i) and the hydrolyzable silane having formula (2) or a partial hydrolyzate thereof (ii) are mixed and used together, the mixing proportions are from 5 to 200 parts by weight, and preferably from 10 to 150 parts by weight, of the hydrolyzable silane of formula (2) or a partial hydrolyzate thereof (ii) per 100 parts by weight of the nitrogenous organic group-containing hydrolyzable silane of formula (1) or a partial hydrolyzate thereof (i). More than 200 parts by weight of component (ii) is undesirable because the stability within the alkaline region of the pH scale is unacceptably low.

The method for preparing component (a) of the inventive coating composition uses primarily water as the solvent, although a solvent obtained by adding to water a water-miscible organic solvent (e.g., an alcohol, ester, ketone, or glycol) may be used if necessary. Examples of suitable organic solvents include alcohols such as methanol, ethanol, 1-propanol, and 2-propanol; esters such as methyl acetate, ethyl acetate, and ethyl acetoacetate; ketones such as acetone and methyl ethyl ketone; and glycols such as glycerol and diethylene glycol.

The amount of solvent is preferably from about 400 to about 5,000 parts by weight, and more preferably from about 1,000 to about 3,000 parts by weight, per 100 parts by weight of the starting silanes. At less than 400 parts by weight of solvent, the reaction may proceed so far that a homogeneous system is not achieved, in addition to which the liquid may become less stable during storage. On the other hand, an amount of solvent in excess of 5,000 parts by weight would be economically disadvantageous.

The amount of water in the solvent is preferably such that the molar ratio of water to the starting silanes is from 5/1 to 50/1. At a molar ratio of less than 5, hydrolysis does not readily proceed to completion, which adversely effects the stability of the liquid, whereas a molar ratio of more than 50 tends to be economically undesirable.

Examples of suitable reaction methods include those given below.

(1) Dropwise addition of the mixed silanes to water or an organic solvent containing at least an amount of water necessary for hydrolysis.

(2) Dropwise addition of water to the mixed silanes which either do or do not contain an organic solvent.

(3) Dropwise addition of the hydrolyzable silane or a partial hydrolyzate thereof serving as component (ii) to water or an organic solvent containing at least an amount of water necessary for hydrolysis, followed by dropwise addition of the nitrogenous organic group-containing hydrolyzable silane or a partial hydrolyzate thereof serving as component (i).

(4) Dropwise addition of the nitrogenous organic group-containing hydrolyzable silane or a partial hydrolyzate thereof serving as component (i) to water or an organic solvent containing at least an amount of water necessary for hydrolysis, followed by dropwise addition of the hydrolyzable silane or a partial hydrolyzate thereof serving as component (ii).

Reaction method (1) is especially preferable because of the stability of the resulting water-based silicone resin composition.

With these methods, the silicone resin is obtained in the form of an aqueous solution. Water may be added or removed in order to adjust the amount of water to 10 to 2,000 parts by weight, and preferably 100 to 1,000 parts by weight, per 100 parts by weight of the silicone resin, and thereby form a water-based binder composition. Less than 10 parts by weight of water gives the organosilicon compound a poor storage stability, whereas more than 2,000 parts by weight of water requires to apply a too much amount of the water-based silicone resin composition, which is not cost-effective. The substantial absence of organic solvent within this water-based binder composition is desirable, although preferably up to 50 parts by weight, and especially up to 30 parts by weight, of organic solvent may be included per 100 parts by weight of the silicone resin.

Now the microparticulate photooxidation catalyst used as component (c) is described. The photooxidation catalyst, when present at the surface of the applied coat, should have a high enough photooxidation catalytic activity to degrade the organic groups that make the surface hydrophobic. Examples of suitable photooxidation catalysts include titanium oxide, cerium oxide and zinc oxide. Anatase-type titanium oxide is especially preferable on account of its chemical stability and low cost. Because the photooxidation catalytic activity generally becomes higher the smaller the mean particle size, it is advantageous to use particles no larger than about 0.1 micron in size. The phrase "mean particle size," as used herein, refers to the value obtained by the Scherrer formula from the integrated width of the highest peak in the x-ray diffraction pattern for crystals in a powder sample of the photooxidation catalyst particles.

For reasons having to do in part with the transparency of the applied film, the photooxidation catalyst in the coating compositions of the invention is most advantageously used in the form of a sol of the photooxidation catalyst particles colloidally dispersed within a dispersing medium. However, the photooxidation catalyst particles may also be used as a water- or solvent-containing paste, or as a powder. Examples of dispersants which may be used in the colloidal sol include water, alcohols such as methanol, ethanol, isopropanol, n-butanol and isobutanol, and Cellosolves. Of these, water is the most preferable in terms of the dispersion stability of the colloid and its mixing stability with the aqueous silicone resin composition. If an organic solvent-dispersed sol is employed, this should preferably be used such that the content of organic solvent in the overall coating composition is up to 5% by weight. At an organic solvent content of more than 5% by weight, the above-described concerns over environmental pollution, safety during application, and storage stability of the liquid coating composition may not be adequately resolved. Moreover, it is advantageous that an alkali be included in the sol of photooxidation catalyst particles colloidally dispersed in this dispersant so that the sol has a pH of at least 9, and preferably 10 or more. If, on the other hand, the photooxidation catalyst is used in the form of a powder or a paste, it is advantageous to mix the catalyst with the water-based silicone resin composition, then thoroughly disperse the catalyst using an apparatus such as a sand mill or a paint shaker.

The amount of microparticulate photooxidation catalyst added to the water-based silicone resin composition is not critical, although an amount of about 10 to 400 parts by weight per 100 parts by weight of the resin solids is preferable. Increasing the photooxidation catalyst content is effective for speeding up the rate at which the surface of the applied coat becomes hydrophilic and enhancing antifouling properties, but at the sacrifice of crack resistance. Hence, use of the photooxidation catalyst within a range of 50 to 200 parts by weight per 100 parts by weight of the resin solids is especially preferable.

In addition to the three above-described essential components (a) to (c), the composition of the invention may also contain additives, diluents and curing catalysts as described below.

The microparticulate photooxidation catalyst is inherently deodorizing and antimicrobial on account of its powerful oxidizing effects when irradiated with light. In order to further enhance these capabilities, substances containing one or more metallic elements selected from among silver, copper, platinum, gold, palladium, iron, nickel, and zinc may also be included.

Commonly known surfactants, titanate coupling agents and silane coupling agents may be added to improve the stability of the inventive compositions in coating liquid form.

The compositions of the invention can be applied onto various substrates, and film-forming ingredients, leveling agents and organic solvents may be added to enhance the film formability. Film-forming ingredients that may be added include water-soluble polymers for increasing the viscosity of the liquid coating for enhancing film formability. Examples include polyvinyl alcohol, polyacrylic acid, carboxymethyl cellulose, polyvinyl acetamide and polyvinyl pyrrolidone. Any commonly known leveling agent may be used, although polyether-modified silicones are preferable. Further, the addition of a small amount of organic solvent is acceptable if it is effective for enhancing the film formability. Preferable solvents for this purpose include alcohols having up to 5 carbon atoms, ethyl cellosolve, butyl cellosolve, ethylene glycol ethers, propylene glycol ethers and lactic acid esters. To maintain the stability of the coating composition, the amount of solvent added is set at 5% by weight or less, based on the overall composition.

Any curing catalyst known to the prior art may be used in the compositions of the invention. Exemplary curing catalysts include basic compounds such as lithium hydroxide, sodium hydroxide, potassium hydroxide, sodium methylate, sodium acetate, sodium formate, n-hexylamine, tributylamine, and diazabicycloundecene; metal-containing compounds such as tetraisopropyl titanate, tetrabutyl titanate, aluminum triisobutoxide, aluminum triisopropoxide, aluminum acetylacetonate, aluminum perchlorate, cobalt octylate, cobalt acetylacetonate, iron acetylacetonate, tin acetylacetonate, and dibutoxytin octylate; and acidic compounds such as p-toluenesulfonic acid, trichloroacetic acid, hydrochloric acid, sulfuric acid, nitric acid, and phosphoric acid. These are used in a catalytic amount.

Combinations of acidic and basic compounds that serve as buffers for regulating the pH may be added. Examples include acetic acid with sodium acetate, and disodium hydrogen phosphate with citric acid. Use can also be made of other ingredients, such as pigments, dyes, and storage stabilizers, so as to provide an excellent coat performance.

A hydrophilic film can be formed as follows. First, the diluent, various additives, and the curing catalyst are added to and mixed with the above composition to prepare a coating liquid. The coating liquid is then applied to the substrate, and the applied film is air-dried or heat-cured to form a cured film. This cured film is subseque ntly irradiated with UV-containing light, making the water-drop contact angle of the film surface 60° or less.

Examples of the substrate material used here include, without particular limitation, plastic moldings, ceramics, glass, metals, wood, cellulose, paper, and composites thereof. The method used to apply the coating composition of the invention onto the substrate is not critical. Some examples of suitable methods of application are spray coating, roller coating, dip coating, spin coating, ink jet coating, and brush coating, although use may be made of other methods as well. Curing of the applied film may be carried out in the same manner as in commonly employed methods for curing applied paint or coating films. That is, the applied film may be air-dried by letting it stand in air, or sufficient curing may be achieved at from room temperature to 250° C. for a period of about 2 minutes to about 6 hours, although there are no strict limits on the heating temperature, time and other conditions so long as the temperature does not exceed the heat resistance temperature of the substrate.

Sunlight will do as the UV-containing light needed to render the film surface hydrophilic, but any light source at any intensity may be used, provided it includes light having a wavelength of 300 to 400 nm. Examples of suitable light sources run the gamut from high ultraviolet intensity sources, such as commercial black light lamps, mercury-vapor lamps and metal halide lamps, to indoor lighting such as fluorescent lamps and incandescent lamps. Although the dose of light required to hydrophilize the film surface varies depending on the content of photooxidation catalyst particles within the applied film and the wavelength distribution of the light source, the film surface can generally be rendered hydrophilic to a contact angle with water of up to 30° in several days time with excitation at an ultraviolet light dose of 0.001 mW/cm$^2$. Because the dose of ultraviolet light present in the sunlight that falls on the Earth's surface is about 0.1 to 1 mW/cm$^2$, the film surface can be hydrophilized in even less time by exposing it to sunlight.

Once the microparticulate photooxidation catalyst is added to and dispersed in the above-described aqueous silicone resin composition which is stable within the alkaline region of the pH scale, there is obtained the coating composition of the present invention which is ready for use. By applying and curing this composition, a coat is formed. When exposed to UV-containing light, the coat is hydrophilized to a water-drop contact angle of 60 degrees or less and exhibits outstanding antifouling properties.

Because the inventive coating compositions also are resistant to light, coating the composition onto signs and billboards or topcoating it onto printed articles is effective for preventing the fading and discoloration of colored images.

EXAMPLES

Examples are given below to illustrate the invention, and are not intended to limit the scope thereof. All parts and percents are by weight.

Synthesis Examples 1 to 5 describe the synthesis of water-based silicone resin compositions, and Examples 1 to 4 and Comparative Examples 1 and 2 describe the preparation of coating compositions.

Synthesis Example 1

A 200-ml reactor equipped with a stirrer, a thermometer, and a condenser was charged with 120 g (6.67 mol) of water. While stirring the water in the reactor, a mixture of 44.4 g (0.2 mol) of $H_2NCH_2CH_2NHCH_2CH_2CH_2Si(OCH_3)_3$ and 13.6 g (0.1 mol) of $CH_3Si(OCH_3)_3$ was added dropwise at room temperature over a period of 10 minutes, whereupon the temperature within the reactor rose from 27° C. to 50° C. The reaction mixture was then heated to a temperature of 60 to 70° C. in an oil bath, and stirred in this state for one hour. Next, an ester adapter was attached, the temperature within the reactor was raised to 98° C., and the methanol generated as a by-product was removed, giving 149 g of Water-Based Silicone Resin Composition 1. The nonvolatiles content of this composition was 25.1% as determined by heating at 105° C. for 3 hours.

Synthesis Example 2

A 200-ml reactor equipped with a stirrer, a thermometer, and a condenser was charged with 120 g (6.67 mol) of water. While stirring the water in the reactor, a mixture of 44.4 g (0.2 mol) of $H_2NCH_2CH_2NHCH_2CH_2CH_2Si(OCH_3)_3$ and 15.2 g (0.1 mol) of $Si(OCH_3)_4$ was added dropwise at room temperature over a period of 10 minutes, whereupon the temperature within the reactor rose from 25° C. to 56° C. The reaction mixture was then heated to a temperature of 60 to 70° C. in an oil bath, and stirred in this state for one hour. Next, an ester adapter was attached, the temperature within the reactor was raised to 98° C., and the methanol generated as a by-product was removed, giving 137 g of Water-Based Silicone Resin Composition 2. The nonvolatiles content of this composition was 27.3% as determined by heating at 105° C. for 3 hours.

Synthesis Example 3

A 200-ml reactor equipped with a stirrer, a thermometer, and a condenser was charged with 120 g (6.67 mol) of water. While stirring the water in the reactor, a mixture of 33.3 g (0.15 mol) of $H_2NCH_2CH_2NHCH_2CH_2CH_2Si(OCH_3)_3$ and 22.8 g (0.15 mol) of $Si(OCH_3)_4$ was added dropwise at room temperature over a period of 10 minutes, whereupon the temperature within the reactor rose from 25° C. to 53° C. The reaction mixture was then heated to a temperature of 60 to 70° C. in an oil bath, and stirred in this state for one hour. Next, an ester adapter was attached, the temperature within the reactor was raised to 98° C., and the methanol generated as a by-product was removed, giving 117 g of Water-Based Silicone Resin Composition 3. The nonvolatiles content of this composition was 27.5% as determined by heating at 105° C. for 3 hours.

Synthesis Example 4

A 200-ml reactor equipped with a stirrer, a thermometer, and a condenser was charged with 120 g (6.67 mol) of water. While stirring the water in the reactor, a mixture of 55.6 g (0.25 mol) of $H_2NCH_2CH_2NHCH_2CH_2CH_2Si(OCH_3)_3$ and 10.4 g (0.05 mol) of $Si(OCH_2CH_3)_4$ was added dropwise at room temperature over a period of 10 minutes, whereupon the temperature within the reactor rose from 27° C. to 49° C. The reaction mixture was then heated to a temperature of 60 to 70° C. in an oil bath, and stirred in this state for one hour. Next, an ester adapter was attached, the temperature within the reactor was raised to 98° C., and the methanol and ethanol generated as a by-product were removed, giving 137 g of Water-Based Silicone Resin Composition 4. The nonvolatiles content of this composition was 31.1% as determined by heating at 105° C. for 3 hours.

Synthesis Example 5

A 1.0-liter reactor equipped with a stirrer, a thermometer, and a condenser was charged with 200 g of ion-exchanged water and 30.0 g of a 15% solution of anionic emulsifying agent Hitenol No. 8 (from Dai-Ichi Kogyo Seiyaku Co., Ltd.), then heated to 50° C. under stirring. Next, 72.0 g (0.47 mol) of $Si(OCH_3)_4$ and 84.5 g (0.62 mol) of $CH_3Si(OCH_3)_3$ were added dropwise over a period of one hour, and stirring was continued for one hour at 50° C. This was followed by cooling, thereby giving 383 g of Water-Based Silicone Resin Composition 5. The nonvolatiles content of this composition was 18.0% as determined by heating at 105° C. for 3 hours.

Examples 1 to 4

The aqueous silicone resin compositions prepared in the synthesis examples, photocatalytic anatase-type titanium oxide sol (as an aqueous dispersion having a solids content of 15%) with a pH of 9 to 10, colloidal silica (as a methanol dispersion having a solids content of 15%), and ion-exchanged water were formulated in the proportions shown in Table 1 to give coating liquids. These liquids were applied and cured under the conditions indicated below, and the resulting coats were subjected to the tests described below.

Comparative Examples 1 and 2

Coating liquids were prepared by formulating the aqueous silicone resin composition obtained in Synthesis Example 5 in the proportions indicated in Table 1. The coats obtained from these coating liquids were subjected to the same tests as in Examples 1 to 4.

(1) Application of Coat
Substrate: aluminum sheet
Method of Application: The coating liquid was applied with a No. 14 bar coater, then air-dried for 30 minutes. Thereafter, it was cured at 150° C. for 20 minutes, thereby forming a coat having a thickness of about 0.5 to 5 µm.

(2) Outdoor Exposure
Samples of the applied film were mounted on a weathering panel (tilted at 45) set up on the grounds of Silicone-Electronics Materials Research Center of Shin-Etsu Chemical Industry Co., Ltd. (located in Matsuida-cho, Usui-gun, Gunma Prefecture, Japan). They were exposed to sunlight for an outdoor exposure period of two months.

(3) Evaluation of Applied Film Surface Contact Angle: With 5 µl of pure water dropped onto the sample surface, the contact angle was measured 30 seconds later using a contact angle measuring device (CA-X150, manufactured by Kyowa Kaimen Kagaku K. K.).

Contaminant Adhesion, Cracking Resistance: Contaminant adhesion and cracking resistance of the applied film before and after outdoor exposure were visually evaluated.

(4) Storage Stability of Coating Composition
The coating composition was stored at 30° C. for 1 month. The appearance of the aged liquid (presence or absence of precipitate, change in viscosity) and the condition of the applied film (appearance, ability to be hydrophilized) were examined and compared with the results of the fresh liquid.

(5) Evaluation of Light Resistance
Plain paper (PPC paper) was single-color printed over its full surface by means of an ink jet printer (BJC-600S, manufactured by Canon Inc.) using magenta ink supplied with the printer. Thereafter, the coating composition was full-surface printed onto the single-color printed area by means of the BJC-600S ink jet printer. This coated paper was subjected to a light resistance test in a desktop accelerated weathering unit (Suntest CPS+, manufactured by Atlas). The results are shown in Table 2. The results obtained when uncoated samples were similarly tested are also shown in Table 2.

The light resistance test was carried out for 100 hours in the Suntest CPS+ desktop accelerated weathering unit, and the color difference ΔE* (color difference of the L*a*b* color space) before and after irradiation was computed. ΔE* values of 0 to less than 5 are rated as A, values of 5 to 10 are rated as B, and values greater than 10 are rated as C.

TABLE 1

| Components (part by weight) | Examples | | | | Comparative Example | |
|---|---|---|---|---|---|---|
| | 1 | 2 | 3 | 4 | 1 | 2 |
| Water-Based Silicone Resin Composition 1 | 100 | | | | | |
| Water-Based Silicone Resin Composition 2 | | 100 | | | | |

TABLE 1-continued

| Components (part by weight) | Examples | | | | Comparative Example | |
|---|---|---|---|---|---|---|
| | 1 | 2 | 3 | 4 | 1 | 2 |
| Water-Based Silicone Resin Composition 3 | | | 100 | | | |
| Water-Based Silicone Resin Composition 4 | | | | 100 | | |
| Water-Based Silicone Resin Composition 5 | | | | | 100 | 100 |
| Titanium oxide sol | 175 | 185 | 185 | 210 | 175 | 175 |
| Silica sol | 8 | 9 | 9 | 12 | 8 | 8 |
| Aluminum perchlorate | | | | | 1 | |
| Ion-exchanged water | 817 | 803 | 800 | 790 | 850 | 850 |
| Contact angle (before irradiation) | 77 | 80 | 78 | 83 | 98 | 88 |
| Contact angle (after 2 weeks) | 7 | 6 | 6 | 8 | 19 | 24 |
| Contact angle (after 2 months) | 2 | 3 | 5 | 3 | 16 | 19 |
| Contaminant adhesion | excellent | excellent | excellent | excellent | fair | fair |
| Cracking resistance | excellent | excellent | excellent | excellent | fair | poor |
| Storage stability | excellent | excellent | excellent | excellent | poor | poor |

TABLE 2

| Coating composition | Light resistance |
|---|---|
| Example 1 | A |
| Example 2 | A |
| Example 3 | A |
| Example 4 | A |
| Uncoated | C |

In addition to substantially reducing or eliminating the amount of organic solvents contained, which is a very high priority in the field of paints and coatings, the coating compositions of the present invention provide applied films having both weather resistance and antifouling properties, and are themselves stable even in the alkaline region of the pH scale. That is, the use as the binder of a water-soluble silicone resin which is stable even under alkaline conditions prevents the agglomeration of photocatalyst particles in the alkaline region of the pH scale and confers excellent storage stability. Moreover, the system, which is alkaline, does not cause undesirable effects such as corrosion when applied to metal substrates.

Japanese Patent Application No. 268098/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A coating composition comprising:
    (a) 100 parts by weight of an organosilicon compound obtained by hydrolyzing, in water or in an organic solvent containing at least an amount of water necessary for hydrolysis, a hydrolyzable silane mixture which includes
        (i) 100 parts by weight of a nitrogenous organic group-containing hydrolyzable silane of formula (1):

$$YR^1{}_mSiR^2{}_{3-m} \quad (1)$$

wherein $R^1$ is a substituted or unsubstituted monovalent hydrocarbon group having 1 to 8 carbons, $R^2$ is an alkoxy or acyloxy group having 1 to 4 carbons, Y is a nitrogenous organic group, and m is 0 or 1, or a partial hydrolyzate thereof, and
        (ii) 5 to 200 parts by weight of a hydrolyzable silane of formula (2):

$$R^3{}_nSiR^4{}_{4-n} \quad (2)$$

wherein $R^3$ is a substituted or unsubstituted monovalent hydrocarbon group having 1 to 8 carbons, $R^4$ is an alkoxy or acyloxy group having 1 to 4 carbons, and n is 0, 1 or 2, or a partial hydrolyzate thereof;
    (b) 10 to 2,000 parts by weight of water; and
    (c) a microparticulate photooxidation catalyst.

2. The coating composition of claim 1, wherein at least one of said nitrogenous organic groups is

(3)

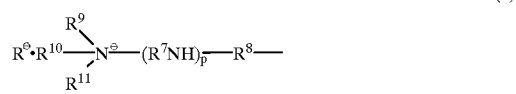
(4)

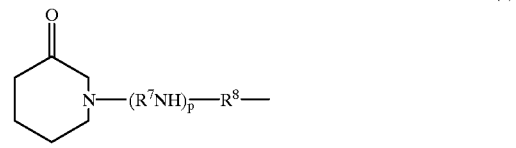
(5)

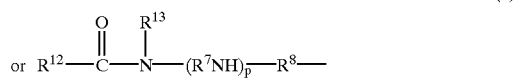
(6)

wherein, $R^5$, $R^6$, and $R^9$ to $R^{13}$ are hydrogen atoms or monovalent hydrocarbon groups having 1 to 8 carbons, with $R^5$ and $R^6$, $R^9$ and $R^{10}$ and $R^{11}$, and $R^{12}$ and $R^{13}$, respectively, being the same or different; R is a halogen atom; $R^7$ and $R^8$ are divalent hydrocarbon groups having 1 to 8 carbons atoms, with $R^7$ and $R^8$ being the same or different; and p is 0 or an integer from 1 to 3.

3. The coating composition of claim 1, wherein the hydrolyzable silane of formula (1) is $H_2NCH_2CH_2HNCH_2CH_2CH_2Si(OCH_3)_3$ or $H_2NCH_2CH_2HNCH_2CH_2CH_2Si(OCH_2CH_3)_3$.

4. The composition of claim 1, wherein the hydrolyzable silane of formula (2) is $Si(OCH_3)_4$, $Si(OCH_2CH_3)_4$, $CH_3Si(OCH_3)_3$, or $CH_3Si(OCH_2CH_3)_3$.

5. The coating composition of claim 1, wherein the microparticulate photooxidation catalyst comprises particles of at least one metal oxide selected from titanium oxide, cerium oxide, and zinc oxide.

6. The coating composition of claim 1 having a pH of at least 9.

7. A method of forming a hydrophilic film, comprising the steps of
applying the coating composition of claim 1 onto a substrate to form a film, and
irradiating a surface of the film with UV-containing light so that the film surface has a contact angle with water of up to 60 degrees.

8. A hydrophilic film-coated article comprising a substrate having on a surface thereof a film of the coating composition of claim 1, which film has a contact angle with water of up to 60 degrees.

9. The coating composition of claim 1, wherein $R^1$ of formula (1) is —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)CH_3$, —$C(CH_3)_3$, —$C_6H_5$, or —$C_6H_{13}$.

10. The coating composition of claim 1, wherein $R^2$ of formula (1) is —$OCH_3$, —$OCH_2CH_3$, —$OCH_2CH_2CH_3$, —$OCH(CH_3)_2$, —$OCH_2CH_2CH_2CH_3$, —$OCH(CH_3)CH_2CH_3$, —$OCH_2CH(CH_3)CH_3$, —$OC(CH_3)_3$, —$OCOCH_3$ or —$OCOCH_2CH_3$.

11. The coating composition of claim 1, wherein $R^2$ of formula (1) is —$OCH_3$, or $OC_2H_5$.

12. The coating composition of claim 1, wherein $R^5$, $R^6$ and $R^9$ to $R^{13}$ of formula (2) are —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)CH_3$, —$C(CH_3)_3$, —$C_6H_5$, or —$C_6H_{13}$.

13. The coating composition of claim 1, wherein $R^3$ of formula (2) is an alkyl, cycloalkyl, alkenyl, aryl or aralkyl group, optionally substituted with a halogen atom.

14. The coating composition of claim 1, wherein $R^3$ of formula (2) is —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)CH_3$, —$C(CH_3)_3$, —$C_6H_5$, or —$C_6H_{13}$.

15. The coating composition of claim 1, wherein $R^4$ of formula (2) is —$OCH_3$, —$OCH_2CH_3$, —$OCH_2CH_2CH_3$, —$OCH(CH_3)_2$, —$OCH_2CH_2CH_2CH_3$, —$OCH(CH_3)CH_2CH_3$, —$OCH_2CH(CH_3)CH_3$, —$OC(CH_3)_3$, —$OCOCH_3$ or —$OCOCH_2CH_3$.

16. The coating composition of claim 1, wherein $R^4$ of formula (2) is —$OCH_3$ or —$OC_2H_5$.

17. The coating composition of claim 1, which comprises 10 to 150 parts by weight of said hydrolyzable silane.

18. The coating composition of claim 1, wherein said hydrolyzing step (a) is performed by dropwise addition of said silane mixture to water or an organic solvent containing at least an amount of water necessary for hydrolysis.

19. The coating composition of claim 1, wherein said microparticulate photooxidation catalyst comprises particles with anatase titanium oxide.

* * * * *